Oct. 31, 1933.                 H. F. WILDER                 1,932,997
                        CARRIER CURRENT TELEGRAPHY
                          Filed June 2, 1932            3 Sheets-Sheet 3

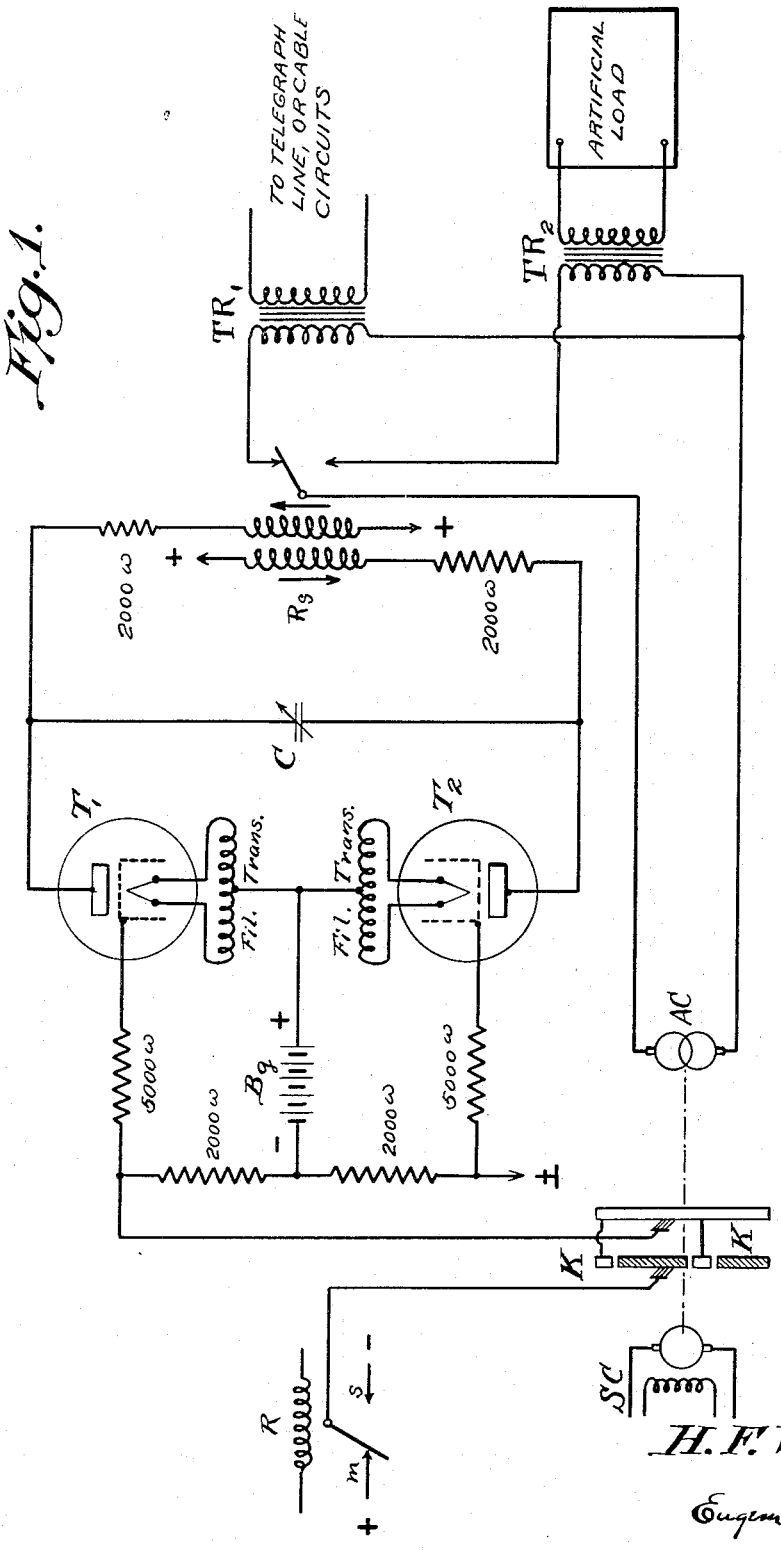

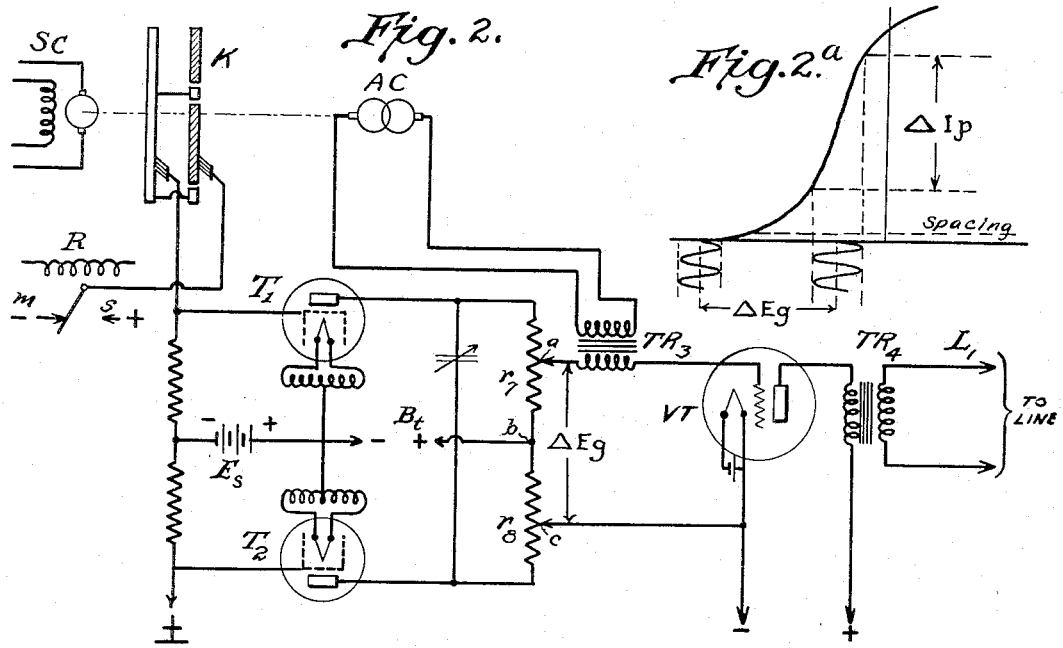
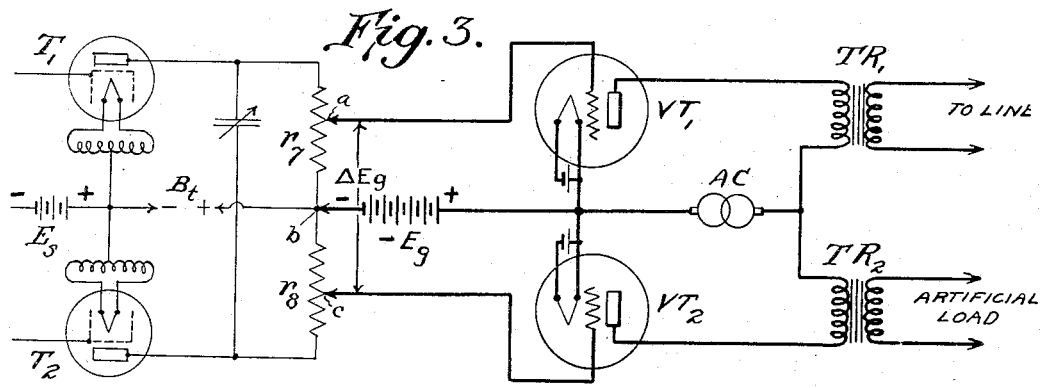
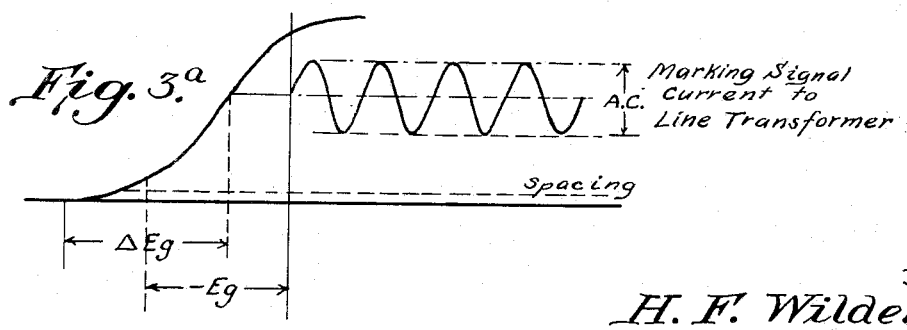

Inventor
H. F. Wilder

Eugene C. Brown
Attorney

Patented Oct. 31, 1933

1,932,997

UNITED STATES PATENT OFFICE

1,932,997

CARRIER CURRENT TELEGRAPHY

Harold F. Wilder, Chatham, N. J., assignor to The Western Union Telegraph Company, New York, N. Y., a corporation of New York Application June 2, 1932. Serial No. 614,987

13 Claims. (Cl. 178—51)

This invention relates to a method of eliminating disturbances in carrier current telegraphy caused by transient currents which are produced at the inception and at the close of a marking pulse in the modulation of a superposed carrier current and which suffer less attenuation in propagation, arriving at the receiving terminal with sufficient magnitude to interfere with the transmission in other frequency bands, viz. the direct current signals. The object of my invention is to eliminate this interference and to so improve the functioning of the carrier current transmitter that the speed of the carrier signaling may be increased.

I have discovered that if the carrier current source is connected to and removed from the line by the modulating transmitter at a predetermined instant, a point in the current wave may be readily found where the transient term is decreased to such an extent as to cause negligible disturbance. This point of least disturbance in the cycle is not necesarily the instant of maximum rate of change. It will be appreciated that the control required demands a high degree of refinement of operation which cannot be obtained with the usual types of relays. I have been able to attain the necessary degree of accuracy by employing grid controlled arc discharge valves or tubes which function instantly in response to a critical voltage and supplying to the tubes short grid control pulses through a synchronous commutator which is held in correct phase relation with the carrier current source. In the following detailed description I shall refer to the accompanying drawings, in which—

Figure 4:
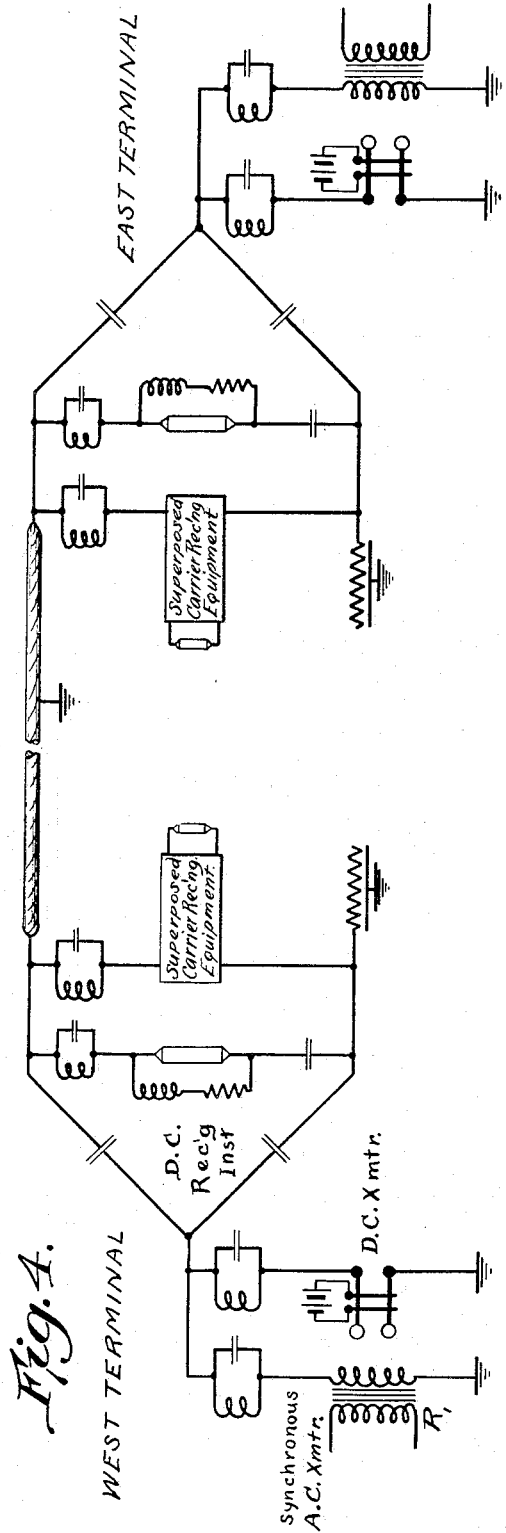
Figure 5:
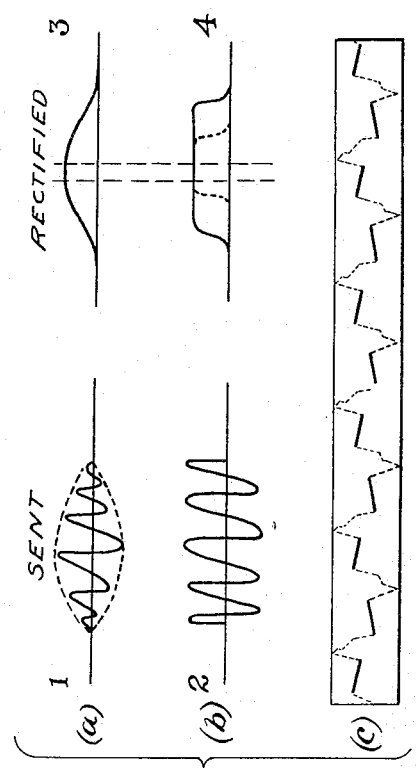

Figures 1, 2 and 3 are schematic illustrations of different arrangements embodying my invention for controlling the proper modulation of the carrier current source;

Figures 2ª and 3ª are diagrams illustrating the conditions of operation of my invention;

Figure 4 is an elemental schematic diagram of a duplex telegraph system arranged for transmission of direct current and superposed carrier current signals to which my method of transmission of the alternating current signals is particularly adapted; and Figure 5 illustrates diagrammatically the transmitted signal pulses under different conditions.

Referring to Figure 1, the gaseous arc discharge tubes $T_1$, $T_2$ are of the well-known type in which the grid completely surrounds the cathode and merely functions to initiate a discharge between the plate and cathode, with no further control. The discharge is instantaneous upon the application of the critical voltage to the grid and the current rises abruptly to full value, which features are especially applicable to my purpose.

To prevent the restarting of the tubes after being extinguished, I provide a stopping battery $B_g$ of 20 to 30 volts acting through a resistance of 2000 ohms to each grid, the positive pole of the battery being connected to the mid-point of the filament transformers. A 5000 ohm resistance in series with each grid prevents excessive grid current and permits the grids to be connected through the commutator and tongue of the receiving relay R directly to 110 volts plus or minus.

The sending-on relay $R_s$ is provided with two coils oppositely connected respectively at one terminal to the anodes or plates of the tubes through a 2000 ohm resistance, the other terminals being connected to plus battery. Connected across the relay coils and resistances is a condenser C, adjustable from 0 to 4 microfarads in steps of 0.020 microfarads. The low reactance of this condenser to a reversal of E. M. F. across its terminals extinguishes either tube instantly upon the starting of the other tube. The capacity of the condenser regulates the rate at which the reversal of energy in the relay coils can take place and consequently provides a means for an equivalent phase shift of the commutator brushes.

The sending-on relay $R_s$ is preferably a high speed telegraph relay having two separate operating coils, which will function satisfactorily for carrier frequencies of 150 to 200 cycles. At higher frequencies thermionic tubes would be employed in place of the sending-on relay. The tongue of this relay connects the output circuit of the A. C. source to the line for a marking impulse and to an artificial load for a spacing impulse. The artificial load has the same identical volt-ampere and power ratings as the line. This prevents disturbance of the oscillator or generator, thus facilitating maintenance of a constant frequency.

The commutator K consists of a segmented ring and a connecting slip ring mounted on a shaft which rotates in synchronism with the incoming signals. I have illustrated a synchronous converter, but there are various other means of securing a constant phase relation between the grid segments of the commutator and the A. C. source of carrier currents which will be evident to engineers. The commutator may be mounted on the generator shaft if such is the source, or on a synchronous motor driven from the A. C. source. A phonic motor with a modified face plate or a multiplex rotor may be used. A fork-controlled D. C. motor may be equipped with the commutator and interrupter which provides plus and minus impulses to control an oscillator.

The grid exciting segments of the commutator are insulated from the remaining portions of the segmented ring and correspond in width to the width of the brush, which in practice is about $\frac{1}{16}''$ wide. The circumference of the commutator and its synchronous speed are so related that the grid exciting segments are 180 electrical degrees apart. To permit phase adjustment, the frame supporting the brushes is fixed to a circular plate which is provided with a suitable scale and is mounted axially on the shaft. The brushes may thus be rotated with respect to the commutator and then clamped in a given position.

The operation of the arrangement illustrated in Fig. 1 will be apparent from the above explanation of the several parts. As the line relay R responds to the impulses of the line signals, its armature connects the grids through the commutator with either plus or minus battery. Positive potential raises the potential of the grid of tube $T_1$ to the critical value, overcoming the biasing potential of battery $B_g$, thus establishing an arc discharge across the plate-cathode circuit which operates the sending-on relay $R_s$ and transmits an alternating current signal from the source A. C. through the transformer $TR_1$ to the line or cable circuit.

A minus or spacing signal causes the armature of line relay R to connect minus battery to the common conductor of the grids, making the grid of tube $T_1$ more negative and raising the grid of tube $T_2$ to the critical starting voltage. As previously pointed out, the arc in valve or tube $T_2$ instantly extinguishes the tube $T_1$ by the transient reversal of its anode potential caused by the discharge of condenser C. The flow of current in the plate circuit of tube $T_2$ operates the sending-on carrier signal relay to its opposite or spacing contact, which connects the A. C. source to the artificial load through the transformer $TR_2$. Either tube can function only every 180 electrical degrees.

In Figure 2 I have replaced the sending-on relay with a vacuum tube circuit which is advisable for higher signaling speeds. The commutator K which constitutes a synchronous switch is mounted on the shaft of a small rotary converter SC which generates an alternating current of the frequency desired for the carrier current. The machine is held to a nearly constant frequency by means of a governor, preferably a vibrating reed controlled device. The alternating current E. M. F. from the slip rings A. C. is applied to the grid of a thermionic vacuum tube VT of the desired power rating through a transformer $TR_3$, the anode circuit of said tube being coupled through a transformer $TR_4$ to the transmission line $L_1$.

When the tongue of the receiving relay R is moved to its left hand contact, minus battery is connected to the common grid conductor which starts the tube $T_2$, as previously described. The flow of current in the plate circuit of this tube causes a drop in potential across the resistance $r_8$ which raises the potential of the grid of tube VT at the instant the alternating carrier current from the slip rings A. C. is applied to the grid, thus placing the axis of the A. C. voltage at a point where a maximum of power will be supplied to the line as indicated at $I_p$ in the diagram Figure 2$^a$. When the tongue of line relay R is moved to the right against its spacing contact, the critical voltage is applied to the grid of tube $T_1$. The current which flows in the plate circuit through resistance $r_7$ produces a drop in voltage at the grid of tube VT at the instant the carrier current is impressed thereon which reduces the spacing current applied by the tube VT to the line through the transformer $TR_4$ to a negligible amount as indicated by the diagram Figure 2$^a$. It will be seen, therefore, that the operation of the arc discharge tubes or valves $T_1$ and $T_2$ respectively displace the potential of the grid of the vacuum tube VT to a point where the maximum of power will be supplied to the line for a marking condition and a negligible amount for a spacing condition. This arrangement is simple and very stable. No artificial load is required and but one vacuum tube is employed.

In the arrangement shown in Figure 3 two vacuum tubes are employed which serve as variable impedances, the value of which respectively controls the power output. The control circuit of the arc discharge tubes $T_1$, $T_2$ determines which tube has the minimum impedance and thereby determines whether the signal is sent to the line or to the artificial load. It will be seen that the artificial load provides a load on the A. C. power source to prevent changes in speed or frequency.

The change in voltage across the resistances $r_7$ and $r_8$ in the anode circuits of the arc discharge tubes $T_1$, $T_2$ must be of sufficient magnitude to overcome the high negative grid biasing battery $E_g$ and in addition make the grid of the operated tube $VT_1$ or $VT_2$ so positive that a maximum power output is obtained, as indicated diagrammatically in Figure 3$^a$. I have shown in Figure 4 the application of this invention to a duplexed superposed current telegraph system. The direct current transmitter and the transmitter for the superposed alternating carrier currents are indicated diagrammatically as applied to the apex of the duplex circuit. Resonant networks are interposed in the circuits of both the transmitters and the receiving instuments. The resonant networks in series with the transmitters at each terminal prevent local interaction between the transmitters at respective terminals. The resonant networks in series with the direct current receiving instruments offer a higher equivalent impedance to the received A. C. signal or carrier current than to the received D. C. signals by reason of the period to which they may be tuned. Similarly the resonant networks in series with the alternating current receiving equipment prevent a large percentage of the received D. C. signals from entering the A. C. receiving networks, amplifying their receiving equipment.

The superposed carrier current signals transmitted by the A. C. transmitter (Xmtr) at either terminal is operated in the manner disclosed in Figs. 1, 2 or 3 as previously described.

To illustrate the severe interference which has heretofore been encountered in superposed carrier current telegraphy due to the interference caused to the low frequency telegraph signals by the transient currents set up at the inception and close of the superposed alternating current pulses, assume that the A. C. transmitter at the west terminal is "keyed" in a haphazard manner. The received current wave at the bridge of the east terminal would be much like the oscillogram shown at Figure 5 (c) and consists of the A. C. signal superposed on a transient pulse of lower period. The period of this pulse is low, since it occurs at the signal or keying frequency and is usually within a very few cycles of the D. C. cable signal frequency. These pulses will, therefore, be received on the D. C. instrument as indicated in said oscillogram and will influence the D. C. instrument in the form of severe interference.

As previously indicated, the transient pulse occurs at the instant of "make" and "break" of the A. C. or carrier current and is greater at the instant of "break". These equivalent D. C. pulses may be largely reduced or even eliminated by employing more elaborate networks in series with the A. C. transmitters, but with a consequent decrease in the signal speed for the reason that these networks oscillate and prevent a rapid increase or fall in the amplitude of the carrier current. Consequently the transmitted A. C. signal appears as indicated at No. 1 in Figure 5 (a), having a cigar-shaped envelope. The same signal after rectification in the receiving instrument appears as at No. 3 in Figure 5 (a).

Now by means of my invention described herein, the disturbing energy or the transient pulse will be eliminated, the carrier current source being connected to and removed from the line at a predetermined point in the cycle of the current wave at which the decreased transient term is the cause of negligible disturbance. Under these conditions, therefore, the received carrier current at the east terminal is substantially the same as the transmitted A. C. current which is substantially the shape of No. 2 in Figure 5 (b) and the signal after rectification in the receiving instrument is more nearly the ideal shown at No. 4 of Figure 5 (b). The resonant circuit in series with the A. C. transmitters may now be reduced to the simple network shown. To reduce the possibility of the usual sources of interference distorting the signals, the more central portion of the signal pulse is utilized to operate the receiving instrument. With the improved form of signal pulse which is made possible by my system of transmission, the length of the signal may be materially decreased as indicated in dotted lines at No. 4 in Figure 5 (b). This improved functioning of the carrier transmitter permits of an increase in the speed of carrier current signaling.

I have pointed out above that the instant of "make" of the A. C. or carrier current must be controlled as well as the instant of "break". This is particularly important in submarine cable superposed carrier telegraphy. I have found that the equivalent phase shift from the optimum position of the brushes or pick-up segment of four electrical degrees will increase distortion. By the coordination of arc discharge tubes of the type described with the synchronous switch or commutator, I may control the "make" and "break" instants to a fraction of a degree in length which is not possible in the pick-up of prior systems. It will also be noted that in my system the pick-up will function twice in a cycle whereas in other systems the pick-up occurs only once in a cycle.

I have described in detail several modifications or arrangements in which my invention may be embodied but it will be apparent to engineers that other modifications may be made within the scope of my claims.

I claim:

1. The method of eliminating electrical disturbances in carrier current telegraphy due to transient currents produced at the inception and close of a pulse in the modulation of a superposed carrier current, characterized by a static discharge control at the inception and at the close of each marking pulse so timed with respect to the carrier current wave that the resultant transient term causes negligible disturbance in other frequency bands.

2. The method of eliminating electrical disturbances in carrier current telegraphy due to transient currents produced at the inception and close of a pulse in the modulation of a superposed carrier current, characterized by a static discharge in response to a critical voltage operating to control the inception and the close of each marking impulse, the application of said critical voltage being so timed with respect to the carrier current wave that the resultant transient term causes negligible disturbance.

3. In a superposed telegraph system, duplex bridges, a transmission line therebetween, direct current transmitting and receiving apparatus, alternating carrier current transmitting and receiving apparatus, said alternating current transmitting apparatus comprising a source of alternating currents, a switch operating synchronously and in timed relation with the cyclic production of said currents, means including an arc discharge path for impressing impulses from said source upon said line and means for applying a critical voltage to start said discharge at the inception of each marking impulse.

4. In a superposed telegraph system, duplex bridges, a transmission line therebetween, direct current transmitting and receiving apparatus, alternating carrier current transmitting and receiving apparatus, said alternating current transmitting apparatus comprising a source of alternating currents, a switch operating synchronously and in timed relation with the cyclic production of said currents, means including an arc discharge path for impressing impulses from said source upon said line, and electrostatic means for starting said discharge at the inception of each marking impulse and for stopping said discharge at the close of each impulse.

5. In a superposed telegraph system, duplex bridges, a transmission line therebetween, direct current transmitting and receiving apparatus, alternating carrier current transmitting and receiving apparatus, said alternating current transmitting apparatus comprising a source of alternating currents, a switch operating synchronously and in timed relation with the cyclic production of said currents, an arc discharge device interposed between said switch and said source, and means to apply a critical voltage to said switch to initiate said discharge.

6. In a superposed telegraph system, duplex bridges, a transmission line therebetween, direct current transmitting and receiving apparatus, alternating carrier current transmitting and receiving apparatus, said alternating current transmitting apparatus comprising a source of alternating currents, a switch operating synchronously and in timed relation with the cyclic production of said currents, arc discharge means interposed between said switch and said source, and means to apply a critical voltage to said switch at the inception and at the close of each marking impulse superposed from said source.

7. In a telegraph system as defined in claim 4, said starting and stopping means being so timed with respect to the carrier current wave that the resultant transient term causes negligible interference with the operation of the direct current receiving apparatus.

8. In a superposed telegraph system, duplex bridges, a transmission line therebetween, direct current transmitting and receiving apparatus, alternating carrier current transmitting and receiving apparatus, said alternating current transmitting apparatus comprising a source of alternating currents, a pair of gaseous conduction devices capable of a sustained discharge after being started, means controlled by said devices respectively for connecting said alternating current source to and disconnecting it from the line, and means for momentarily applying a critical starting voltage to one tube at the inception of an A. C. marking impulse period and to the other tube at the close of said period.

9. In a telegraph system as defined in claim 8, said means for applying the critical voltages being so timed with respect to the carrier current wave that the resultant transient term causes negligible interference with the operation of the direct current receiving apparatus.

10. In a superposed carrier current telegraph system, a transmission line, terminal direct current transmitting and receiving apparatus, terminal alternating carrier current transmitting and receiving apparatus, a pair of gaseous conduction devices having starting elements and capable of sustained discharge after being started, means for applying a critical starting voltage to the element of one or the other starting element in accordance with code signals, circuit arrangements whereby the starting of either device extinguishes the discharge in the other device, and a thermionic tube having its input connected to said circuit arrangements in a manner to receive a maximum voltage upon the discharge of one device and a minimum voltage upon the discharge of the other tube, said carrier current transmitting apparatus being connected to the input and the output of said tube being connected to the transmission line.

11. In a superposed carrier current telegraph system as defined in claim 10, said means for applying a critical starting voltage being so timed with respect to the carrier current wave that the resultant transient term causes negligible interference with the operation of the direct current receiving apparatus.

12. In a superposed carrier current telegraph system, a transmission line, terminal direct current transmitting and receiving apparatus, terminal alternating carrier current transmitting and receiving apparatus, a pair of gaseous conduction devices having starting elements and capable of sustained discharge after being started, means for applying a critical starting voltage to the element of one or the other starting element in accordance with code signals, circuit arrangements whereby the starting of either device extinguishes the discharge in the other device, and a pair of thermionic tubes having their input or grid elements connected to said circuit arrangements in such a manner that one tube operates at a maximum value and the other at minimum value when one gaseous device discharges and vice versa when the other device discharges, said carrier current transmitting apparatus and the output of said tubes being connected to the transmission line.

13. In a superposed carrier current telegraph system, a transmission line, terminal direct current transmitting and receiving apparatus, terminal alternating carrier current transmitting and receiving apparatus, a pair of gaseous conduction devices having starting elements and capable of sustained discharge after being started, means for applying a critical starting voltage to the element of one or the other starting element in accordance with code signals, circuit arrangements whereby the starting of either device extinguishes the discharge in the other device, and a pair of thermionic tubes having their input or grid elements connected to said circuit arrangements in such a manner that one tube operates at a maximum value and the other at minimum value when one gaseous device discharges and vice versa when the other device discharges, the output of said tubes being connected to the transmission line and to an artificial load and the carrier current transmitting apparatus being connected in shunt between the cathodes of the tubes and an intermediate point between said connection with the line and the artificial load.

HAROLD F. WILDER.